United States Patent
Keum et al.

(10) Patent No.: US 12,489,174 B2
(45) Date of Patent: Dec. 2, 2025

(54) THERMAL RUNAWAY MITIGATION SYSTEM FOR A RECHARGEABLE ENERGY STORAGE SYSTEM ARRANGED IN A VEHICLE

(71) Applicant: GM Global Technology Operations LLC, Detroit, MI (US)

(72) Inventors: SeungHwan Keum, Northville, MI (US); Ronald O. Grover, Jr., Northville, MI (US); Jian Gao, Auburn Hills, MI (US); Xiaofeng Yang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 548 days.

(21) Appl. No.: 17/973,933

(22) Filed: Oct. 26, 2022

(65) Prior Publication Data

US 2024/0145858 A1 May 2, 2024

(51) Int. Cl.

| | |
|---|---|
| *H01M 50/375* | (2021.01) |
| *B60L 50/64* | (2019.01) |
| *H01M 10/48* | (2006.01) |
| *H01M 50/249* | (2021.01) |
| *B60L 58/24* | (2019.01) |

(52) U.S. Cl.
CPC ......... *H01M 50/375* (2021.01); *B60L 50/64* (2019.02); *H01M 10/486* (2013.01); *H01M 50/249* (2021.01); *B60L 58/24* (2019.02); *H01M 2220/20* (2013.01)

(58) Field of Classification Search
CPC ............. H01M 50/375; H01M 50/249; H01M 10/486; H01M 2220/20; B60L 50/64; B60L 58/24
See application file for complete search history.

(56) References Cited

U.S. PATENT DOCUMENTS

| | | | |
|---|---|---|---|
| 10,377,264 B2 | 8/2019 | Lopez et al. | |
| 11,654,786 B2 | 5/2023 | Han et al. | |
| 2006/0278370 A1 | 12/2006 | Rockenfeller et al. | |
| 2012/0301368 A1* | 11/2012 | Dobashi ................. | B01F 23/60 422/292 |
| 2014/0338999 A1* | 11/2014 | Fujii ...................... | B60L 58/26 180/68.5 |

(Continued)

FOREIGN PATENT DOCUMENTS

CN 113147312 A * 7/2021 ......... B60H 1/00392

OTHER PUBLICATIONS

Yang. CN113147312A. Jul. 23, 2021. English machine translation by EPO. (Year: 2021).*

*Primary Examiner* — James Lee
(74) *Attorney, Agent, or Firm* — CANTOR COLBURN LLP

(57) ABSTRACT

A rechargeable energy storage system (RES S) including a thermal runaway propagation (TRP) mitigation system includes a housing having at least one outlet, a plurality of energy storage cells arranged in the housing, and at least one duct extending along the plurality of energy storage cells. The at least one duct is fluidically connected to the at least one outlet. A gas delivery system including a gas generation system is operable to deliver an amount of inert gas into the housing to purge gases from one or more of the plurality of energy storage cells through the at least one outlet.

20 Claims, 3 Drawing Sheets

(56) References Cited

U.S. PATENT DOCUMENTS

| | | |
|---|---|---|
| 2019/0202302 A1 | 7/2019 | Turik et al. |
| 2020/0067237 A1 | 2/2020 | Sarraf et al. |
| 2021/0347270 A1 | 11/2021 | Cole et al. |
| 2022/0288435 A1 | 9/2022 | Murray |
| 2022/0401770 A1 | 12/2022 | Sandahl et al. |
| 2022/0407174 A1 | 12/2022 | Sandahl et al. |
| 2023/0141760 A1 | 5/2023 | Schroth et al. |
| 2023/0166142 A1* | 6/2023 | Shin ................. A62C 3/16 169/61 |
| 2023/0299512 A1 | 9/2023 | Bizon et al. |
| 2024/0025278 A1 | 1/2024 | Yen et al. |
| 2024/0131940 A1 | 4/2024 | Andruskiewicz, IV et al. |
| 2024/0131952 A1* | 4/2024 | Wang ................. B60L 53/18 |
| 2024/0162559 A1 | 5/2024 | Gao et al. |
| 2024/0195111 A1 | 6/2024 | Heckelsmueller et al. |
| 2024/0332841 A1 | 10/2024 | Winterholler et al. |
| 2024/0336152 A1 | 10/2024 | Yen et al. |

\* cited by examiner

THERMAL RUNAWAY MITIGATION SYSTEM FOR A RECHARGEABLE ENERGY STORAGE SYSTEM ARRANGED IN A VEHICLE

INTRODUCTION

The subject disclosure relates to the art of vehicles and, more particularly, to a thermal runaway mitigation system for a rechargeable energy storage system arranged in a vehicle.

Electric and hybrid electric vehicles include rechargeable energy storage systems (RESS). In a hybrid vehicle, the RESS is charged through operation of an engine operating on fossil fuels or through regenerative braking. Electric vehicles rely on an external energy supply to recharge the RESS. A RESS typically includes multiple sealed cells that store electrical energy. During operation or charging of the RESS, one or more of the sealed cells may exceed a predetermined temperature; referred to as thermal runaway. When a sealed cell experiences thermal runaway, potentially combustible gases may be produced. Accordingly, it is desirable to provide a system to mitigate thermal runaway and to prevent or extinguish ignition of combustible gasses.

SUMMARY

A rechargeable energy storage system (RESS) including a thermal runaway propagation (TRP) mitigation system in accordance with a non-limiting example, includes a housing having at least one outlet, a plurality of energy storage cells arranged in the housing, and at least one duct extending along the plurality of energy storage cells. The at least one duct is fluidically connected to the at least one outlet. A gas delivery system including a gas generation system is operable to deliver an amount of inert gas into the housing to purge gases from one or more of the plurality of energy storage cells through the at least one outlet.

In addition to one or more of the features described herein the gas delivery system includes a nozzle having a longitudinal axis, the nozzle including a gas outlet that delivers the amount of inert gas along the longitudinal axis.

In addition to one or more of the features described herein the gas delivery system includes a nozzle having a longitudinal axis, the nozzle including a plurality of gas outlets that deliver the amount of inert gas radially outwardly of the longitudinal axis.

In addition to one or more of the features described herein an amount of flame retardant material is arranged in the gas delivery system.

In addition to one or more of the features described herein the amount of flame retardant material is arranged downstream of the gas generation system.

In addition to one or more of the features described herein an amount of phase change material (PCM) is arranged in the gas delivery system, the amount of PCM cooling the amount of inert gas passing into the housing.

In addition to one or more of the features described herein a temperature sensor is mounted in the housing.

In addition to one or more of the features described herein a battery monitoring system is operatively connected to the temperature sensor and the gas delivery system, the battery monitoring system triggering the gas delivery system upon receiving a signal from the temperature sensor that a temperature in the housing has exceeded a predetermined level.

In addition to one or more of the features described herein the gas delivery system triggers release of the amount of inert gas if a temperature in the housing exceeds a predetermined level.

In addition to one or more of the features described herein the amount of inert gas comprises nitrogen gas.

A vehicle, in accordance with a non-limiting example, includes a body, an electric motor supported relative to the body, and a rechargeable energy storage system (RESS) including a thermal runaway propagation (TRP) mitigation system operatively connected to the electric motor. The RESS includes a housing having at least one outlet, a plurality of energy storage cells arranged in the housing, and at least one duct extending along the plurality of energy storage cells. The at least one duct is fluidically connected to the at least one outlet. A gas delivery system including a gas generation system is operable to deliver an amount of inert gas into the housing to purge gases from one or more of the plurality of energy storage cells through the at least one outlet.

In addition to one or more of the features described herein the gas delivery system includes a nozzle having a longitudinal axis, the nozzle including a gas outlet that delivers the amount of inert gas along the longitudinal axis.

In addition to one or more of the features described herein the gas delivery system includes a nozzle having a longitudinal axis, the nozzle including a plurality of gas outlets that deliver the amount of inert gas radially outwardly of the longitudinal axis.

In addition to one or more of the features described herein an amount of flame retardant material is arranged in the gas delivery system.

In addition to one or more of the features described herein the amount of flame retardant material is arranged downstream of the gas generation system.

In addition to one or more of the features described herein an amount of phase change material (PCM) is arranged in the gas delivery system, the amount of PCM cooling the amount of inert gas passing into the housing.

In addition to one or more of the features described herein a temperature sensor is mounted in the housing.

In addition to one or more of the features described herein a battery monitoring system is operatively connected to the temperature sensor and the gas delivery system, the battery monitoring system triggering the gas delivery system upon receiving a signal from the temperature sensor that a temperature in the housing has exceeded a predetermined level.

In addition to one or more of the features described herein the gas delivery system triggers release of the amount of inert gas if a temperature in the housing exceeds a predetermined level.

In addition to one or more of the features described herein the amount of inert gas comprises nitrogen gas.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
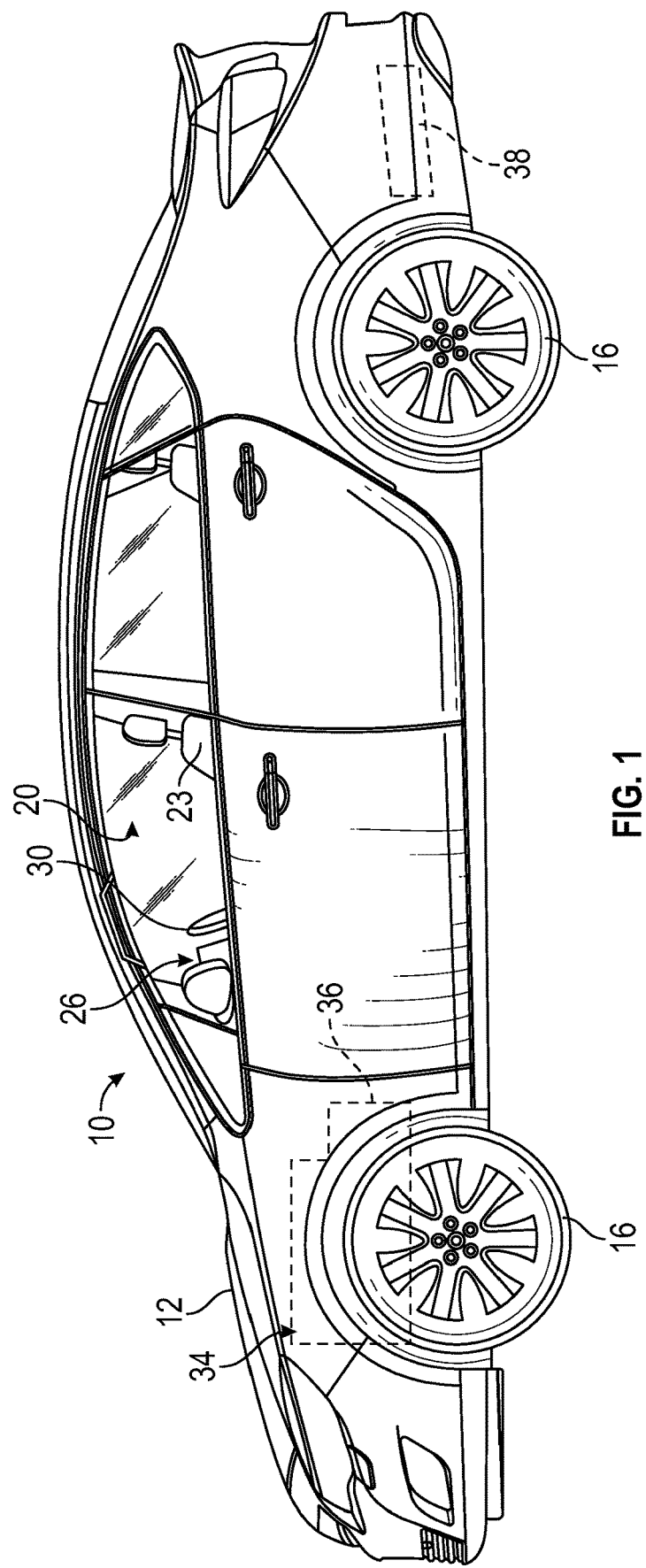
FIG. 1 is a plan view of a vehicle including a rechargeable energy storage system (RES S) having a thermal runaway mitigation system, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Two of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
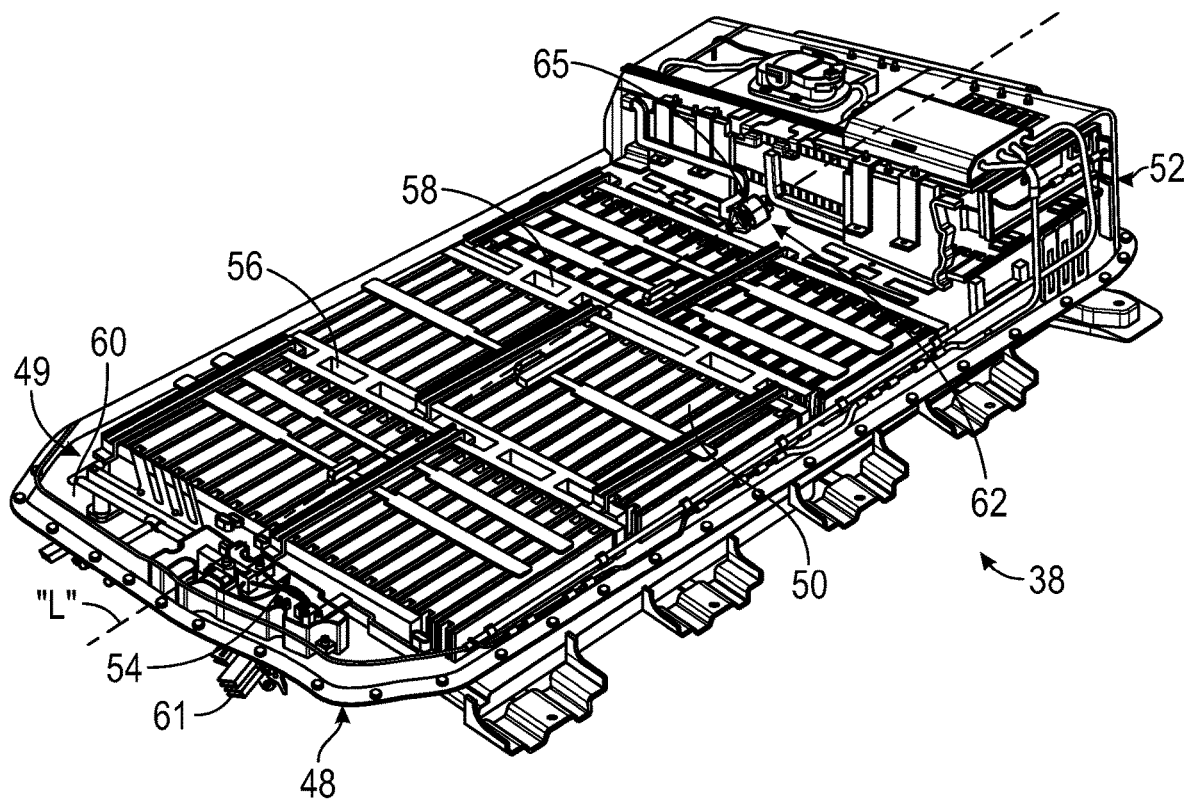
FIG. 2 is a perspective view of the RESS without a cover having the thermal runaway mitigation system, in accordance with a non-limiting example.
Figure 4:
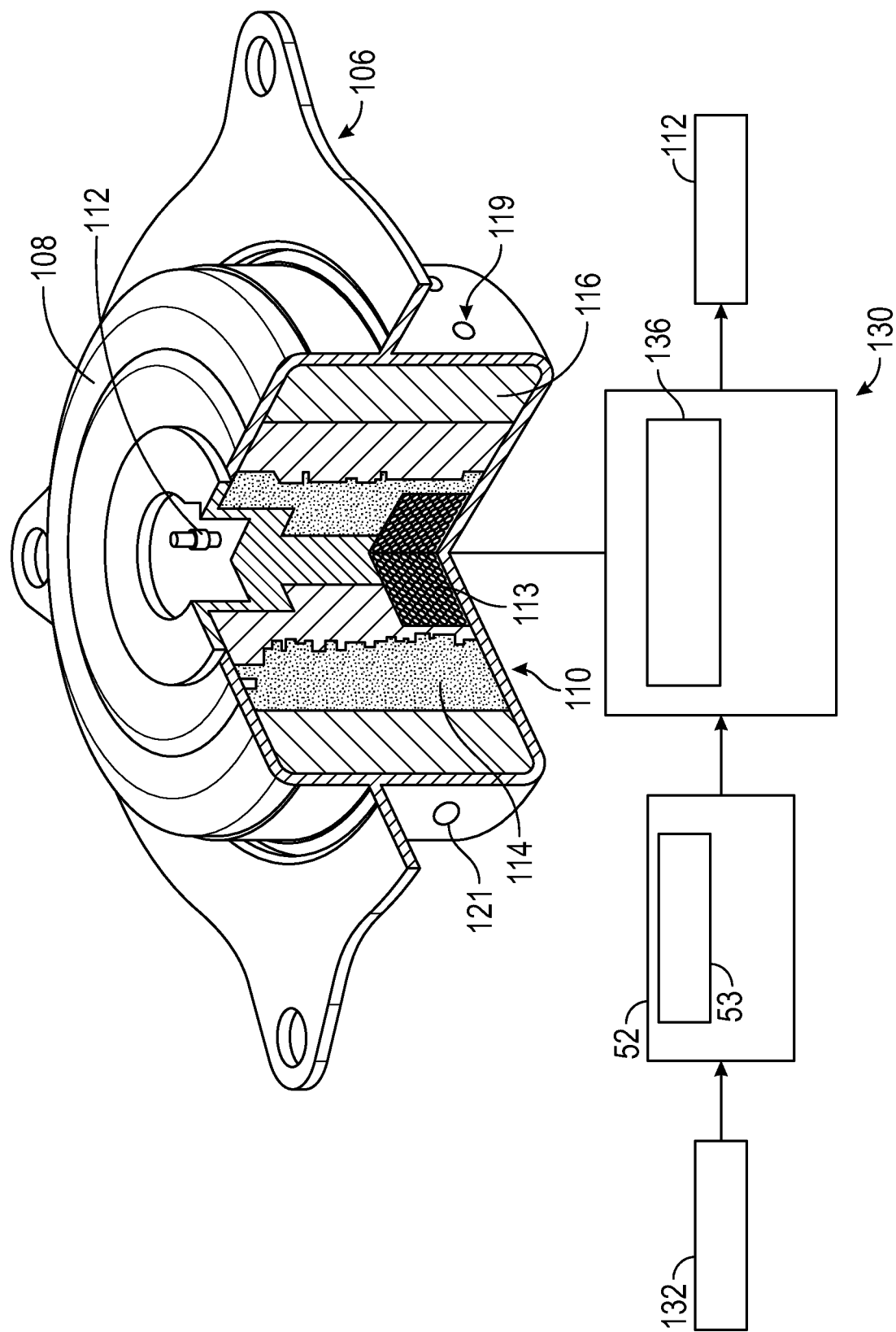
FIG. 4 is a partially cut-away perspective view of the thermal runaway mitigation system, in accordance with another non-limiting example.

Vehicle 10 includes an electric motor 34 connected to a transmission 36 that provides power to one or more of the plurality of wheels 16. A rechargeable energy storage system (RES S) 38 provides power to electric motor 34. Referring to FIG. 2, RESS 38 is shown without a cover and includes a housing 48 having an interior portion 49 within which are arranged a plurality of energy storage cells, one of which is indicated at 50. Each of the plurality of energy storage cells 50 is connected to a battery management system (BMS) 52 arranged in housing 48. BMS 52 includes a non-volatile memory module 53 (FIG. 4).

In the non-limiting example shown, RESS 38 includes a primary duct 54 that extends along a longitudinal axis "L" of housing 48 below energy storage cells 50 and a plurality of secondary ducts including a second duct 56 and a third duct 58 that extend substantially perpendicularly from primary duct 54. Housing 48 also includes a perimeter duct 60 and outlet 61 that is fluidically connected to interior portion 49.

Figure 3:
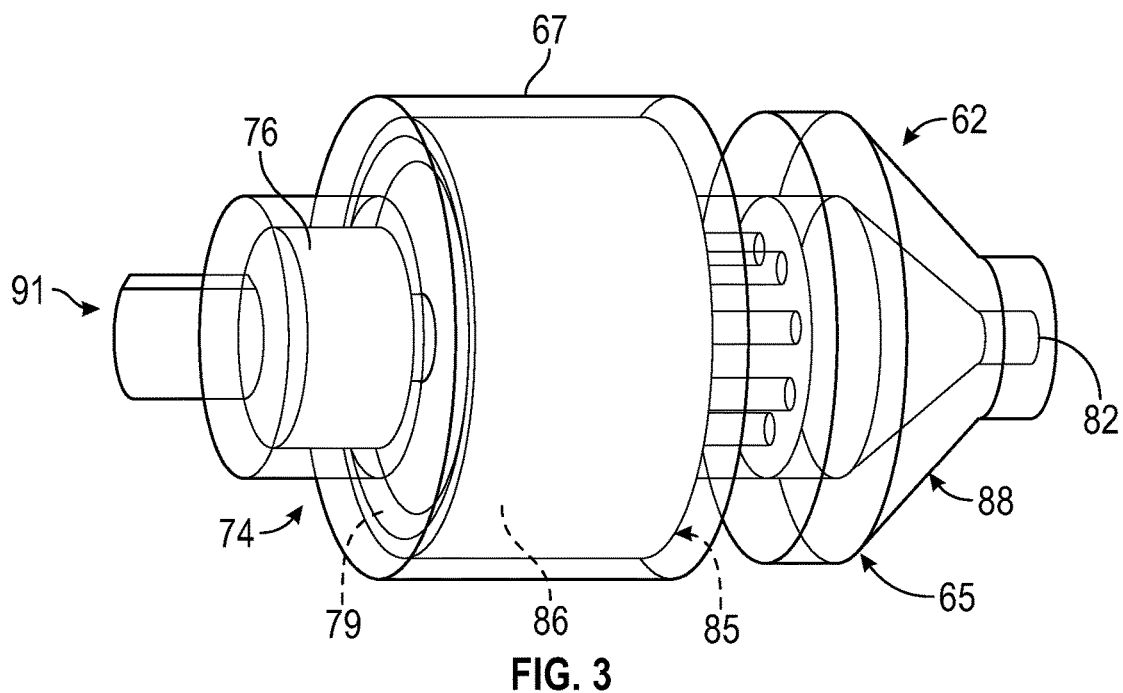
FIG. 3 is a perspective glass view of a gas delivery system of the thermal runaway mitigation system, in accordance with a non-limiting example.

In accordance with a non-limiting example, RESS 38 includes a thermal runaway propagation (TRP) mitigation system 62. As shown in FIG. 3, TRP mitigation system 62 includes a gas delivery system 65 that is operable to introduce an amount of inert gas into interior portion 49. In a non-limiting example, gas delivery system 65 includes a housing portion 67 that supports a gas generation system 74 having an energetic material 76 that is introduced into a combustion chamber 79 to produce the amount of inert gas that passes through a gas outlet 82 into primary duct 54. In a non-limiting example, the inert gas may include nitrogen but the particular form of the inert gas may vary and could be tailored to specific applications and/or cell chemistry. The number and location of gas delivery system(s) 65 within housing 48 may vary. It should also be understood that the geometry of gas outlet 82 may vary and could be tailored to particular applications, the particular inert gases used, and the like.

Combustion chamber 79 may be surrounded by a cooling jacket 85 that is filled with a coolant such as a phase change material (PCM) 86. PCM 86 reduces combustion temperatures such that the amount of inert gas passing through gas outlet 82 is below a predetermined temperature threshold. In a non-limiting example, gas delivery system 65 may also include a flame retardant material chamber 88 that is filled with an amount of flame retardant material. The amount of flame retardant material may mix with the amount of inert gas passing though interior portion 49 and exit through outlet 61. The amount of inert gas combined with the amount of flame retardant material will mitigate a thermal runaway of energy storage cells 50 and prevent combustion of volatile gases. That is, in one non-limiting example, gas delivery system 65 includes a thermally responsive passive trigger 91 that, when exposed to a predetermined temperature, activates the energetic material 76 to produce the amount of inert gas.

Reference will now follow to FIG. 4 in describing a gas delivery system 106 in accordance with another non-limiting example. Gas delivery system 106 includes a housing portion 108 within which is arranged a gas generation system 110 having an initiator 112 connected to an energetic material 113 and operatively connected to a gas generant 114. Gas generant 114 is surrounded by a coolant 116 that maintains temperatures of generated gas below a predetermined temperature threshold. Housing portion 108 includes an outlet portion 119 having a plurality of radially disposed outlets 121. Radially disposed outlets 121 deliver an amount of inert gas into interior portion 49.

Gas delivery system 106 includes an active trigger mechanism 130 coupled to BMS 52 and initiator 112 along with a temperature sensor 132. Active trigger mechanism 130 may include a trigger module 136. When a predetermined signal is received from BMS 52 indicating a need for gas suppression, trigger module 136 activates initiator 112 to initiate energetic material 113 and trigger gas generant 114 to produce the amount of inert gas that is delivered into interior portion 49 to purge volatile gases from housing 48.

For example, when temperature sensor 132 detects a temperature in interior portion 49 that exceeds the predetermined temperature threshold stored in non-volatile memory module 51, active trigger mechanism is initiated. When initiated, the amount of inert gas is produced by gas generant 114. The amount of inert gas is initially cooled by coolant 116 and passed into interior portion 49 in order to purge volatile gasses through outlet 61 that may be produced by one or more energy storage cells 50 and thereby prevent ignition thereof.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A rechargeable energy storage system (RESS) including a thermal runaway propagation (TRP) mitigation system comprising:
   a housing including at least one outlet;
   a plurality of energy storage cells arranged in the housing;
   at least one duct extending along the plurality of energy storage cells, the at least one duct being fluidically connected to the at least one outlet; and
   a gas delivery system including a gas generation system operable to deliver an amount of inert gas into the housing to purge gases from one or more of the plurality of energy storage cells through the at least one outlet, the gas delivery system including:
   a housing portion in fluid communication with the at least one duct;
   the gas generation system including a combustion chamber disposed in the housing portion, and an energetic material disposed in the combustion chamber; and
   a coolant chamber disposed in the housing portion and surrounding the combustion chamber, the coolant chamber including a coolant configured to maintain generated inert gas below a predetermined temperature threshold.

2. The RESS according to claim 1, wherein the gas delivery system includes a nozzle having a longitudinal axis, the nozzle including a gas outlet that delivers the amount of inert gas along the longitudinal axis.

3. The RESS according to claim 1, wherein the gas delivery system includes a nozzle having a longitudinal axis, the nozzle including a plurality of gas outlets that deliver the amount of inert gas radially outwardly of the longitudinal axis.

4. The RESS according to claim 1, further comprising an amount of flame retardant material arranged in the gas delivery system.

5. The RESS according to claim 4, wherein the amount of flame retardant material is arranged downstream of the gas generation system.

6. The RESS according to claim 1, further comprising wherein the coolant includes an amount of phase change material (PCM) arranged in the gas delivery system, the amount of PCM cooling the amount of inert gas passing into the housing.

7. The RESS according to claim 1, further comprising a temperature sensor mounted in the housing.

8. The RESS according to claim 7, further comprising a battery monitoring system operatively connected to the temperature sensor and the gas delivery system, the battery monitoring system triggering the gas delivery system upon receiving a signal from the temperature sensor that a temperature in the housing has exceeded a predetermined level.

9. The RESS according to claim 1, wherein the gas delivery system triggers release of the amount of inert gas if a temperature in the housing exceeds a predetermined level.

10. The RESS according to claim 1, wherein the amount of inert gas comprises nitrogen gas.

11. A vehicle comprising:
    a body;
    an electric motor supported relative to the body; and
    a rechargeable energy storage system (RESS) including a thermal runaway propagation (TRP) mitigation system operatively connected to the electric motor, the RESS comprising:
    a housing including at least one outlet;
    a plurality of energy storage cells arranged in the housing;
    at least one duct extending along the plurality of energy storage cells, the at least one duct being fluidically connected to the at least one outlet; and
    a gas delivery system including a gas generation system operable to deliver an amount of inert gas into the housing to purge gases from one or more of the plurality of energy storage cells through the at least one outlet, the gas delivery system including:
    a housing portion in fluid communication with the at least one duct;
    the gas generation system including a combustion chamber disposed in the housing portion, and an energetic material disposed in the combustion chamber; and
    a coolant chamber disposed in the housing portion and surrounding the combustion chamber, the coolant chamber including a coolant configured to maintain generated inert gas below a predetermined temperature threshold.

12. The vehicle according to claim 11, wherein the gas delivery system includes a nozzle having a longitudinal axis, the nozzle including a gas outlet that delivers the amount of inert gas along the longitudinal axis.

13. The vehicle according to claim 11, wherein the gas delivery system includes a nozzle having a longitudinal axis, the nozzle including a plurality of gas outlets that deliver the amount of inert gas radially outwardly of the longitudinal axis.

14. The vehicle according to claim 11, further comprising an amount of flame retardant material arranged in the gas delivery system.

15. The vehicle according to claim 14, wherein the amount of flame retardant material is arranged downstream of the gas generation system.

16. The vehicle according to claim 11, wherein the coolant includes an amount of phase change material (PCM) arranged in the gas delivery system, the amount of PCM cooling the amount of inert gas passing into the housing.

17. The vehicle according to claim 11, further comprising a temperature sensor mounted in the housing.

18. The vehicle according to claim 17, further comprising a battery monitoring system operatively connected to the temperature sensor and the gas delivery system, the battery monitoring system triggering the gas delivery system upon receiving a signal from the temperature sensor that a temperature in the housing has exceeded a predetermined level.

19. The vehicle according to claim 11, wherein the gas delivery system triggers release of the amount of inert gas if a temperature in the housing exceeds a predetermined level.

20. The vehicle according to claim 11, wherein the amount of inert gas comprises nitrogen gas.

* * * * *